United States Patent [19]

Boom et al.

[11] Patent Number: 4,506,704
[45] Date of Patent: Mar. 26, 1985

[54] DISTRIBUTING VALVE

[75] Inventors: Johannes Boom; Teunis Terlouw, both of Amsterdam, Netherlands

[73] Assignee: Shell Oil Company, Houston, Tex.

[21] Appl. No.: 453,550

[22] Filed: Dec. 27, 1982

[30] Foreign Application Priority Data

Dec. 30, 1981 [GB] United Kingdom ............... 8139073

[51] Int. Cl.³ ............................................. F16K 11/20
[52] U.S. Cl. ..................................... 137/883; 137/872; 193/31 R; 406/183
[58] Field of Search ............ 137/872, 883; 193/31 R, 193/31 A; 406/183

[56] References Cited

U.S. PATENT DOCUMENTS

| 389,589 | 9/1888 | Metcalf | 193/31 R |
|---|---|---|---|
| 2,732,263 | 1/1956 | Riordan | 406/183 |
| 3,386,474 | 6/1968 | Kimmel | 137/883 |
| 3,586,046 | 6/1971 | Alford | 137/872 |
| 3,771,564 | 11/1973 | Bianchetta et al. | 137/596.13 X |
| 4,070,961 | 1/1978 | O'Rourke et al. | 137/883 X |
| 4,190,082 | 2/1980 | Crespo | 137/625.17 |
| 4,196,752 | 4/1980 | Niskanen | 137/865 |
| 4,413,935 | 11/1983 | Smith et al. | 406/181 |

Primary Examiner—Gerald A. Michalsky

[57] ABSTRACT

A distributing valve comprising a valve housing 1 having an inlet 2 and a plurality of outlets 3, the interior of the valve housing 1 being provided with a plurality of displaceably arranged closure members 6, each closure member 6 cooperating with an outlet and being provided with an end face 9 forming a smooth guiding surface from the inlet 2 to one or more other outlets 3 in the closed position of said closure member.

4 Claims, 1 Drawing Figure

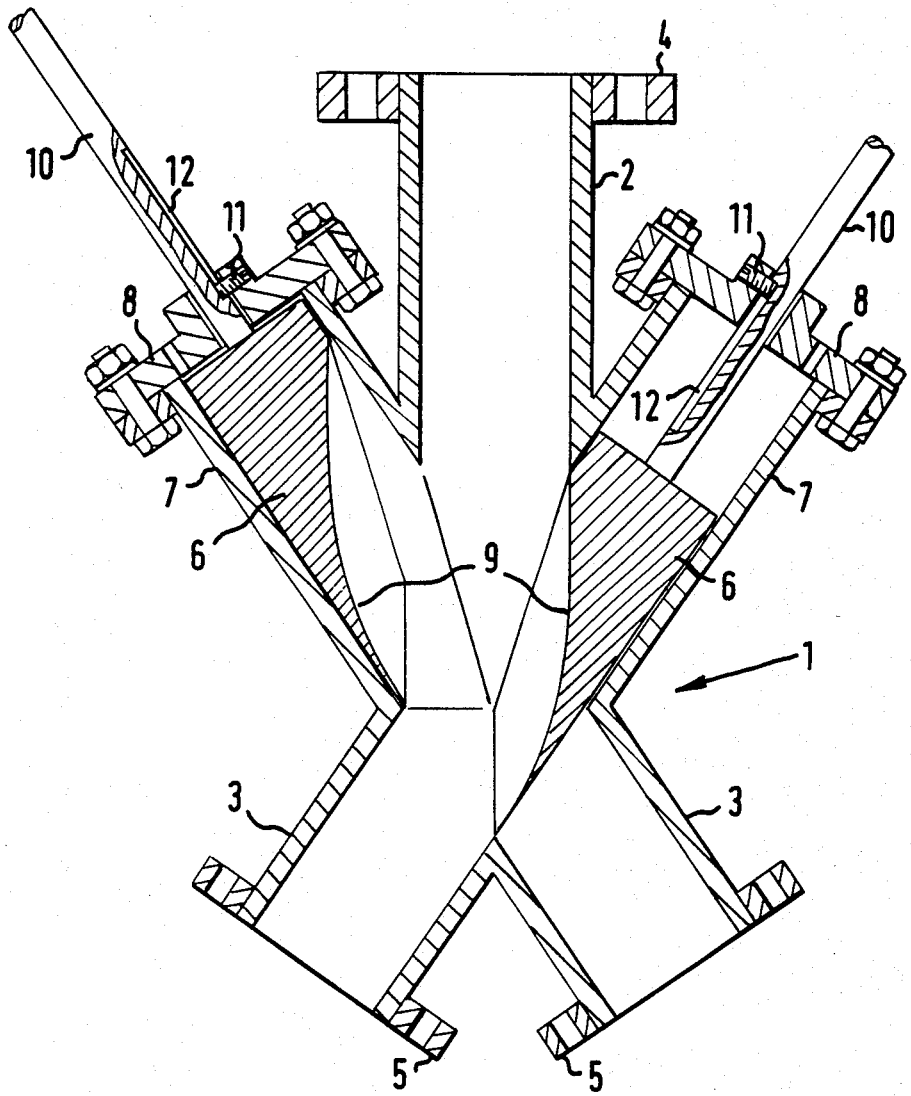

DISTRIBUTING VALVE

BACKGROUND OF THE INVENTION

The invention relates to a distributing valve, provided with one inlet and a plurality of outlets, for diverting a flow passing therethrough selectively into one or more of said outlets. The invention relates more particularly to a distributing valve adapted for the passage of solid particles, such as coal, ash or slag particles, therethrough.

For transporting solid particles from a central location to a plurality of destinations it is well known to apply a system of pipelines interconnected by means of distributing valves for directing the solids to one or more preselected destinations.

A variety of distributing valves for directing flows in branched pipelines are already known. Most of these distributing valves operate satisfactorily when they are applied to liquid flows, but have disadvantages when applied to solids flows. These disadvantages are mainly caused by a maldistribution of the solids in the known valves, resulting in plugging and/or jamming of the valves, so that the flow of particles through the pipelines provided with such valves is hindered.

SUMMARY OF THE INVENTION

The object of the present invention is to provide a distributing valve, adapted for the passage of solid partices wherein the above disadvantages have been overcome.

The distributing valve according to the invention comprises a valve housing having an inlet and a plurality of outlets, the interior of the valve housing being provided with a plurality of displaceably arranged closure members, each closure member co-operating with an outlet and being provided with an end face forming a smooth guiding surface from the inlet to one or more other outlets in the closed position of said closure member.

In a suitable embodiment of the invention the closure members are each slidably arranged in a tubular element positioned opposite to an outlet.

In the distributing valve according to the invention solid particles are smoothly guided through the valve passages, and no dead zones are present where solids might accumulate. A further advantage of the proposed distributing valve is that the valve can be brought in a fully closed position.

BRIEF DESCRIPTION OF THE DRAWING

The invention will now be described by way of example only in more detail with reference to the accompanying drawing showing a longitudinal section of an embodiment of the invention.

DESCRIPTION OF THE PREFERRED EMBODIMENTS

The distributing valve shown in the drawing comprises a valve housing 1, having an inlet 2 and two outlets 3, arranged at opposite sides of the longitudinal axis of the inlet 2. The inlet 2 and the outlets 3 are provided with flanges 4 and 5 respectively for connecting the valves to flanges of a pipeline system (not shown). In the embodiment shown in the drawing the cross-sectional areas of the inlet 2 and the outlets 3 are substantially equal to each other. The interior of the valve housing 1 is further provided with two closure members 6, each being arranged opposite to an outlet 3. The closure members 6 are mounted in tubular elements 7, closed at their free ends by flanges 8.

The cross-sectional area of each closure member 6 is chosen slightly smaller than the cross-sectional area of the corresponding tubular element 7, so that the closure members 6 can easily slide in said tubular elements 7. The closure members 6 are each provided with an end face 9 being so formed that when a closure member 6 is in the closed position, as shown at the right-hand side of the drawing, its end face 9 forms a smooth guiding surface from the inlet 2 to another outlet 3, in the drawing the outlet at the left-hand side of the drawing. As shown in the drawing the closure members 6 are so arranged relative to each other that they can be displaced simultaneously to shut off both outlets 3.

For displacing the closure members 6, each closure member is provided with a rod-shaped element 10 connected to the outer end of said closure member and passing through an opening in the accompanying flange 8. By displacing the rod-shaped element 10 the relevant closure member 6 can be moved through the accompanying tubular element 7.

To prevent rotation of the closure members 6, locking means are provided, consisting of a pin-shaped element 11 connected to the flange 8 and fitting in a groove 12 in the rod-shaped element 10. The length of the grooves 12 determines the maximum axial displacement of the closure members 6 in the tubular elements 7.

During operation of the valve for directing a flow of solid particles, the inlet of the valve is arranged in communication with, for example, a storage vessel and the outlets of the valves are connected to pipelines leading to two different locations where the solids are to be delivered. When the closure members 6 are both in a fully retracted position with respect to the valve housing 1, solids supplied via the inlet 2 will leave the valve via both outlets 3. When the solids should leave the valve via only one of the outlets 3, the other outlet 3 is shut off by displacing the rod-shaped element 10 inwardly so that the last-mentioned outlet 3 is covered by part of the side of the accompanying closure member 6. In this position the end face 9 of the displaced closure member 6 forms a smooth guiding surface for the flow of solids from the inlet 2 to the open outlet 3. Since there are no obstructions in the so formed passage for the solids such as occurring when applying for example butterfly valves, the solids will not accumulate in any part of the passage so that plugging of the valve is prevented. If it is required to fully close the valve both closure members 6 are displaced inwardly thereby closing both outlets 3. In the closed position of the closure members 6, the most inward ends of the end faces 9 are in a mating position relative to one another.

Instead of applying two outlets as shown in the drawing the valve may be provided with more than two outlets without departing from the present invention, provided that the number of closure members equals the number of outlets.

It is noted that the invention is not restricted to the specific means for displacing the closure members 6 as shown in the drawing. Instead of these means the closure members 6 may be, for example, pneumatically or hydraulically displaced.

Instead of the pin and groove arrangement for controlling the position of the closure members 6, as shown in the drawing, any other position-controlling mechanism may be applied. The extent of axial movement of a closure member 6 may, for example, be controlled by a projecting part of the inward end of the tubular element 7 in which the closure member 6 is arranged. Prevention of rotation of the closure members 6 in their tubular elements 7 can also be obtained by applying closure members and accompanying tubular elements 7 having slightly eliptical cross sections.

The distributing valve may be further provided with means for supplying fluid between the closure members 6 and their accompanying tubular elements 7, to remove contaminants which might prevent displacement of said closure members 6 and reduce friction.

We claim:

1. A distributing valve comprising:
   a valve body, said valve body having a cylindrical inlet and at least two cylindrical outlets, said outlets being arranged symmetrically with respect to the longitudinal axis of said inlet and extending in an opposite direction from said inlet;
   at least two additional cylindrical members disposed on said valve body, one of said additional cylindrical members extending in opposite directions from each of said outlets and arranged coaxial with said outlets; and
   at least two solid cylindrical closure members, said closure members being disposed in said additional cylindrical members for axial movement between a first position where they are retracted into said additional cylindrical members and a second position where they extend into said valve body and effectively close one of said outlets, the portion of said closure member that extends into the valve body being contoured to form a smooth guiding surface from said inlet to one of said outlets when said closure member is extended into said valve housing to close the other outlet.

2. The distributing valve of claim 1 and in addition locking means disposed to prevent rotation of said closure members in said cylindrical elements.

3. The distributing valve of claim 2 and in addition means disposed to limit the axial movement of said closure members.

4. The distributing valve of claim 2 wherein all of said closure members may be simultaneously moved to a position where they close all of said outlets.

* * * * *